United States Patent
Kim

(10) Patent No.: US 8,400,441 B2
(45) Date of Patent: Mar. 19, 2013

(54) DISPLAY APPARATUS AND CONTROL METHOD THEREOF

(75) Inventor: Kyoung-wook Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1304 days.

(21) Appl. No.: 11/438,065

(22) Filed: May 22, 2006

(65) Prior Publication Data

US 2007/0005785 A1    Jan. 4, 2007

(30) Foreign Application Priority Data

Jun. 29, 2005   (KR) .................. 10-2005-0056689

(51) Int. Cl.
*G06F 3/038* (2006.01)
*G06F 1/26* (2006.01)
*G06F 1/00* (2006.01)

(52) U.S. Cl. ........ 345/212; 345/204; 345/205; 345/211; 713/320; 713/323; 713/324

(58) Field of Classification Search .......... 345/530–535, 345/556, 2.1–2.3, 204–212; 713/320–324
See application file for complete search history.

(56) References Cited

U.S. PATENT DOCUMENTS

| | | | |
|---|---|---|---|
| 6,324,651 B2 * | 11/2001 | Kubik et al. ................. | 713/323 |
| 6,445,730 B1 * | 9/2002 | Greszczuk et al. ........... | 375/219 |
| 6,772,353 B2 | 8/2004 | Konaka et al. | |
| 7,505,795 B1 * | 3/2009 | Lim et al. ...................... | 455/574 |
| 2004/0160408 A1 * | 8/2004 | Hwang ......................... | 345/102 |
| 2004/0204079 A1 | 10/2004 | Hamdi | |
| 2004/0254683 A1 * | 12/2004 | Kim .............................. | 700/286 |

FOREIGN PATENT DOCUMENTS

| | | |
|---|---|---|
| JP | 2000-227787 | 8/2000 |
| KR | 2003-36991 | 5/2003 |
| WO | 02076081 A2 | 9/2002 |

OTHER PUBLICATIONS

Chinese Office Action issued Dec. 19, 2008 in Chinese Application No. 2006100943665.
European Search Report issued Mar. 3, 2010 in EP Application No. 06115745.9.

* cited by examiner

*Primary Examiner* — Lun-Yi Lao
*Assistant Examiner* — Jarurat Suteerawongsa
(74) *Attorney, Agent, or Firm* — Stanzione & Kim, LLP

(57) ABSTRACT

A display apparatus includes a display part to display an image thereon, a video signal processor to convert an input video signal into a signal having a format displayable by the display part, a network controller connectable to a network to transmit and receive data according to a predetermined protocol, a data processor to process the data transmitted and/or received through the network controller into a video signal processible by the video signal processor, and a controller to control power to be supplied to the data processor according to whether the data is being transmitted and/or received by the network controller through the network. Accordingly, the display apparatus transmits and receives data through a network and reduces power consumption.

21 Claims, 4 Drawing Sheets

DISPLAY APPARATUS AND CONTROL METHOD THEREOF

CROSS-REFERENCE TO RELATED APPLICATIONS

This application claims the benefit under 35 U.S.C. §119 of Korean Patent Application No. 2005-56689, filed on Jun. 29, 2005, in the Korean Intellectual Property Office, the disclosure of which is incorporated herein in its entirety by reference.

BACKGROUND OF THE INVENTION

1. Field of the Invention

The present general inventive concept relates to a display apparatus, and more particularly, to a display apparatus which transmits and receives data through a network and reduces power consumption.

2. Description of the Related Art

Generally, a display apparatus includes a liquid crystal display (LCD), a plasma display panel (PDP), etc. The display apparatus is employed as a monitor of a TV or a computer to display images thereon.

If the display apparatus is provided as the monitor, the display apparatus performs various functions, such as receiving TV broadcast signals through a tuner and displaying the TV broadcast signals thereon, outputting sound signals from the computer through speakers thereof, and displaying video signals received from the computer thereon as images. Such a monitor having various functions is referred to as a multi function monitor.

Typically, conventional monitors and computers are connected to each other through a D-Sub connector or a DVI connector to allow the video signal from the computer to be transmitted to the monitor.

The multi function monitor may comprise an S-video connector, a component connector or a composite connector, in addition to the D-Sub connector or the DVI connector, to receive the video signal from external devices, such as a DVD or a VCR.

Also, the computer has extended its support from a single output connector, such as the D-Sub connector, to two and more output connectors, such as the D-Sub connector, the DVI connector, the S-video connector, etc. Thus, the computer is connected with two and more monitors.

Recent developments in the multi function monitor provide various functions such as displaying data received through a network as images, sending and receiving a predetermined control signal through the network, and being connected with the computer through a video cable.

Furthermore, various power saving modes are provided to reduce power consumption of the monitor. For example, using display power management signaling (DPMS) of the video electronics standard association (VESA), the monitor is converted into a power saving mode according to conditions of the video signals received from the computer (e.g., according to whether a synchronous signal is supplied).

However, the conventional monitor having the network function does not have an additional power saving mode when processing data received through the network.

Accordingly, it is desirable to provide a monitor having a network function to operate in a power saving mode according to operating conditions of the monitor in order to reduce power consumption of the monitor.

SUMMARY OF THE INVENTION

The present general inventive concept provides a display apparatus which transmits and receives data through a network and reduces power consumption.

Additional aspects of the present general inventive concept will be set forth in part in the description which follows and, in part, will be obvious from the description, or may be learned by practice of the present general inventive concept.

The foregoing and/or other aspects of the present general inventive concept may be achieved by providing a display apparatus comprising a display part to display an image thereon, a video signal processor to convert an input video signal into a signal having a format displayable by the display part, a network controller connectable to a network to transmit and receive data according to a predetermined protocol, a data processor to process the data transmitted and/or received through the network controller into a video signal having a format processible by the video signal processor, and a controller to control power to be supplied to the data processor according to a determination of whether the data is transmitted and/or received by the network controller through the network.

The network controller may supply data receiving information regarding whether the data is transmitted and/or received through the network to the controller, and the controller may control the power supplied to the data processor based on the data receiving information supplied by the network controller.

The data processor may comprise a data storage part to store at least one control routine therein to process the data received through the network controller, a memory to load the control routine, a main processor to load the control routine to the memory and to execute the control routine, and a bridge circuit to allow the data storage part and the main processor to communicate with each other.

The main processor may convert the data received through the network controller into a video signal and output the video signal, and the data processor may further comprise a video signal transmitter to convert the video signal output by the main processor into the video signal having the format processible by the video signal processor and to supply the converted video signal to the video signal processor.

The foregoing and/or other aspects of the present general inventive concept may also be achieved by providing a display apparatus, comprising a network controller connectable to a network to receive image data through the network, a data processor to process the image data, and a sensing unit to sense whether the network controller is in a receiving state or an idle state, and to control an amount of power supplied to the data processor based on the sensed state of the network controller.

The foregoing and/or other aspects of the present general inventive concept may also be achieved by providing a display apparatus connectable to a network to receive image data through the network and to display the received image data thereon, comprising a processing unit to process the image data received through the network to make the image data displayable, and a controller to determine whether the image data is being received through the network and to cut off power supplied to the processing unit when the image data is not received through the network for a predetermined amount of time.

The foregoing and/or other aspects of the present general inventive concept may also be achieved by providing a display apparatus, comprising a first input unit to receive a first image in a first format, a second input unit to receive a second image in a second format, a data processor to process the second image received by the second input unit, a video signal processor unit to convert the processed second image and the first images into a displayable format, a display unit to display the first and second images converted into the displayable format by the video signal processor, and a control unit to determine whether the second image is received by the second input unit and to control power supplied to the data processor based on whether the second image is received by the second input unit.

The foregoing and/or other aspects of the present general inventive concept may also be achieved by providing a method of controlling a display apparatus having a display part to display an image thereon, a video signal processor to convert an input video signal into a format displayable by the display part, a network controller connectable to a network to transmit and receive data according to a predetermined protocol, and a data processor to process the data transmitted and/or received through the network controller, the method comprising determining whether data is being received by the network controller through the network, cutting off power supplied to the data processor if it is determined that data is not being received by the network controller, and supplying power to the data processor if it is determined that data is received by the network controller.

The foregoing and/or other aspects of the present general inventive concept may also be achieved by providing a method of controlling a display apparatus a network controller to receive image data through a network and data processor to processor the image data received through the network, the method comprising sensing whether the network controller is in a receiving state or an idle state, and controlling an amount of power supplied to the data processor based on the sensed state of the network controller.

The foregoing and/or other aspects of the present general inventive concept may also be achieved by providing a computer readable recording medium having executable codes to perform a method of controlling a display apparatus having a display part to display an image thereon, a video signal processor to convert an input video signal into a format displayable by the display part, a network controller to be connected to a network and to transmit and receive data according to a predetermined protocol, and a data processor to process data transmitted and/or received through the network controller, the method comprising determining whether data is being transmitted to the network controller through the network, cutting off power supplied to the data processor if it is determined that the data is not being transmitted to the network controller, and supplying power to the data processor if it is determined that data is being transmitted to the network controller.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
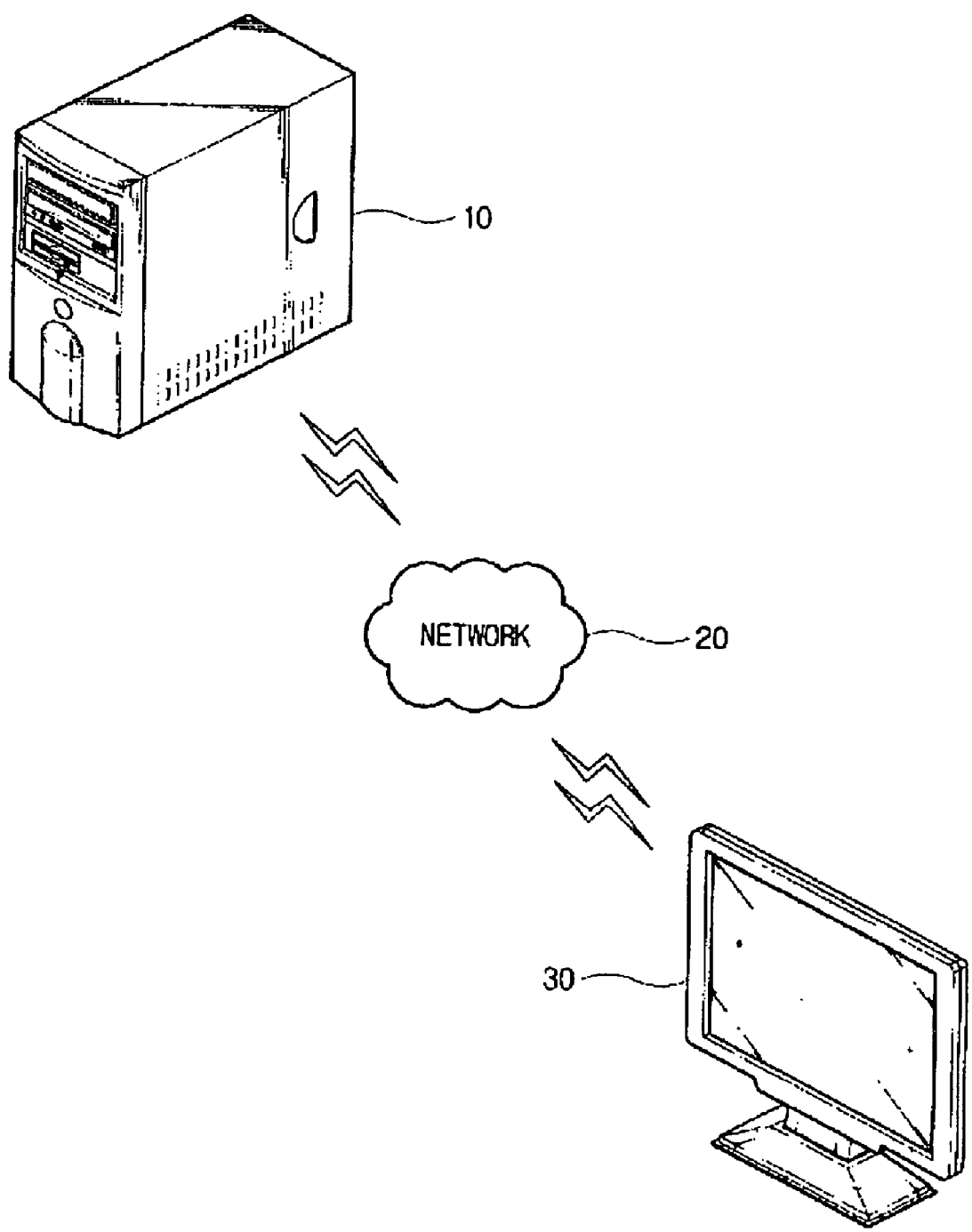
FIG. 1 is a diagram illustrating a connection between a display apparatus and a computer according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
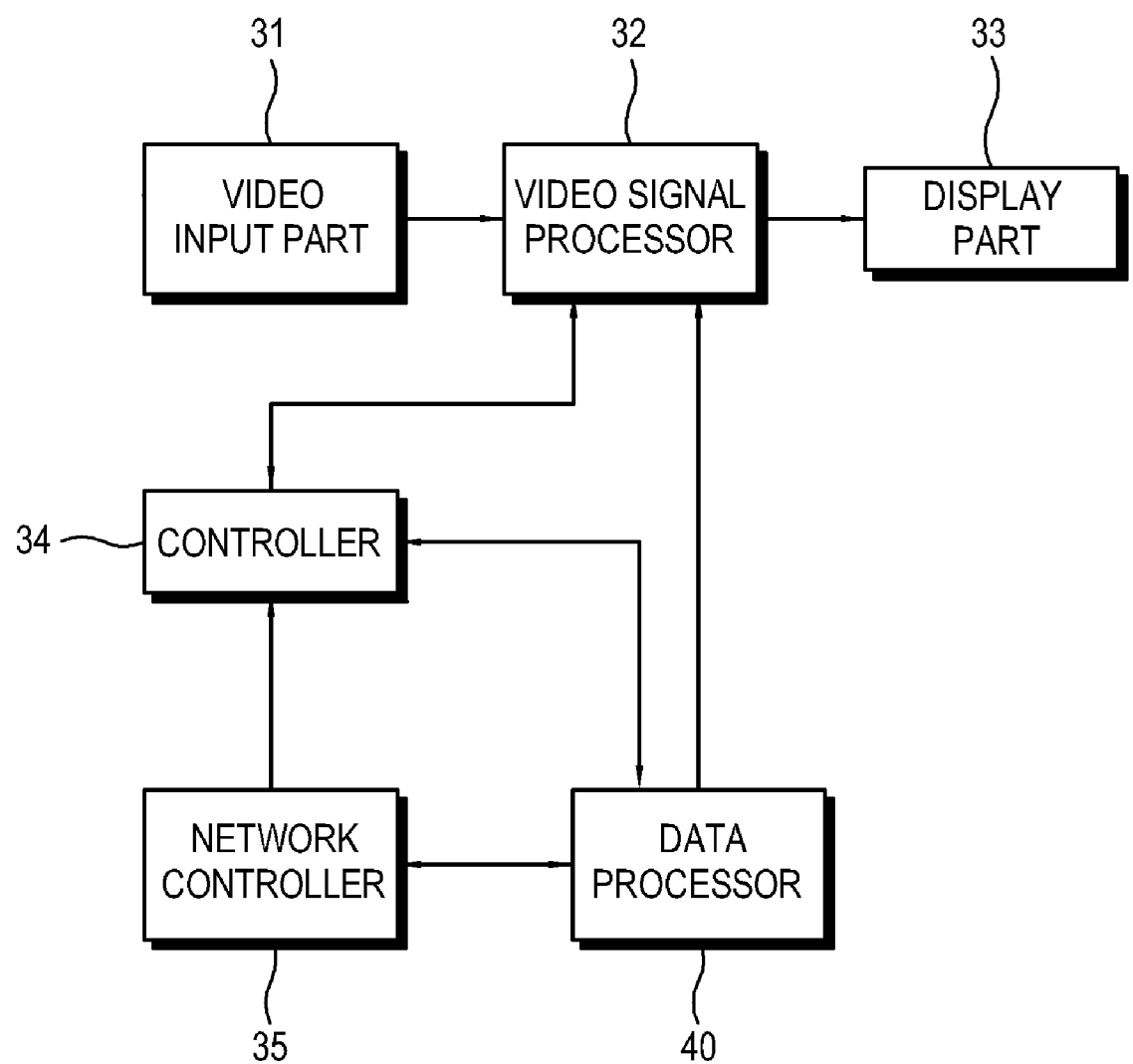
FIGS. 2 and 3 are control block diagrams illustrating the display apparatus of FIG. 1.
Figure 3:
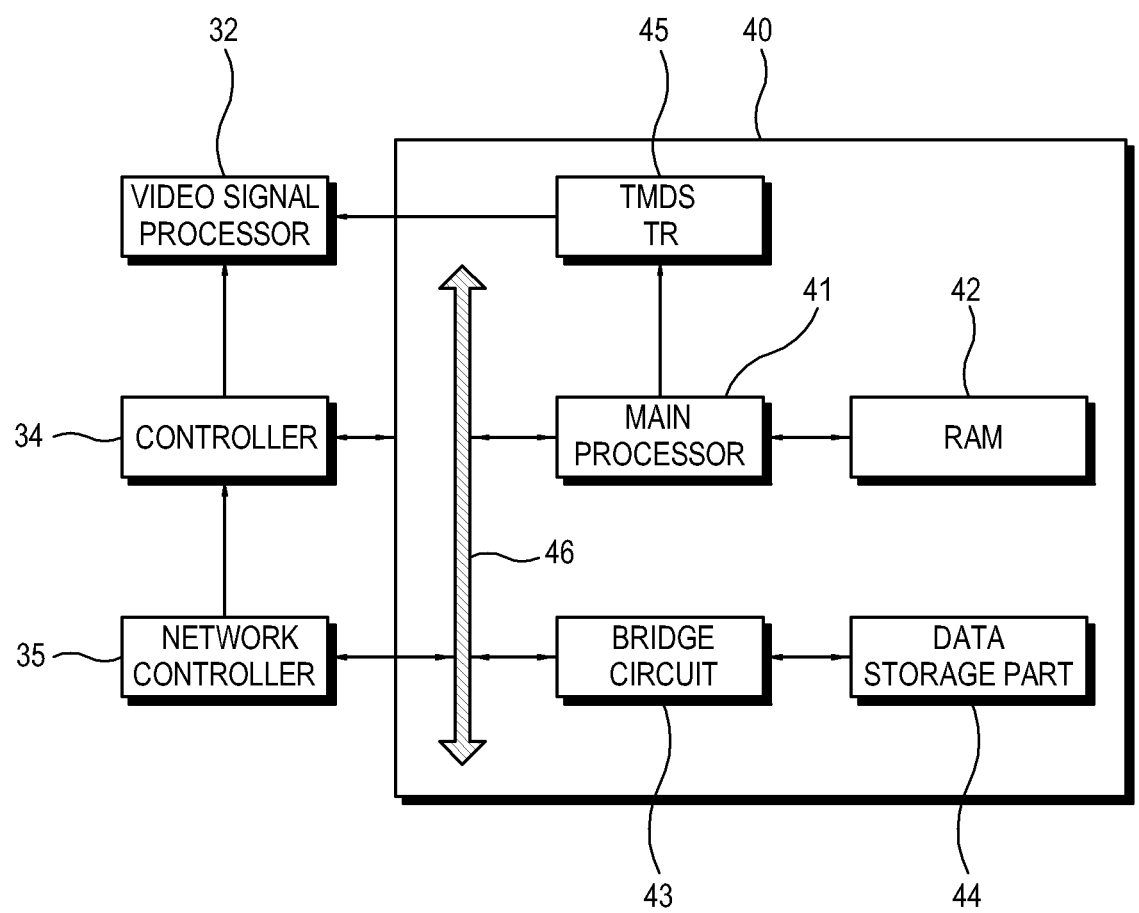

FIGS. 1-3 illustrate a display apparatus 30 according to an embodiment of the present general inventive concept. Referring to FIGS. 1 and 2, the display apparatus 30 is connectable with an external device, e.g., with a computer 10, through a network 20. The display apparatus 30 may comprise a video input part 31 to connect with the computer 10 or a video signal generator, such as a DVD, VCR, TV signal generator, etc., through a video cable to transmit a first video signal according to a predetermined video format. Here, the video input part 31 may comprise at least one of a D-Sub connector, a DVI connector, an S-video connector, a component connector, and a composite connector, but it is not limited thereto. The computer 10 may be connectable to a network controller 35 of the display apparatus 30 through the network 20.

The display apparatus 30 may further comprise a display part 33, a video signal processor 32, the network controller 35, a data processor 40, and a controller 34, as illustrated in FIG. 2.

The video signal processor 32 converts the first video signal input from the video input part 31 or a second video signal input from the data processor 40 into a third video signal having a format displayable by the display part 33 and supplies the converted video signal to the display part 33.

The video signal processor 32 may be provided to correspond to various formats of the input video signals. For example, the video signal processor 32 may comprise a scaler and a video signal converter to convert the first video signal input through the video input part 31 or the second video signal input from the data processor 40 from various formats into a video signal having a format processible by the scaler.

The video signal converter may comprise at least one of an A/D converter, a video decoder, and a tuner, corresponding to various formats of the first and second video signals. The scaler converts the video signal output from the video signal converter to conform to output standards (e.g., a vertical frequency, resolution, an image ratio, etc.) of the display part 33.

The display part 33 displays the converted video signal received from the video signal processor 32 as an image thereon. The display part 33 may employ one of a liquid crystal display (LCD) panel and a plasma display panel (PDP), but the present general inventive concept is not limited thereto.

The network controller 35 is connectable to the network 20 to transmit and receive data according to a predetermined protocol. The network controller 35 may be connected with the computer 10 through a local area network (LAN) wirelessly or in a wired manner according to various embodiments of the present general inventive concept. Also, the network controller 35 may be connected with the computer 10 through various other methods, such as infrared communication, bluetooth, etc., as long as the network controller 35 can communicate with the computer 10.

The data processor 40 processes the data transmitted and/or received through the network controller 35 and outputs the second video signal to the video processor 32. Referring to FIG. 3, the data processor 40 may comprise a data storage part 44, a RAM 42 as a memory, a main processor 41, and a bridge circuit 43.

The data storage part 44 stores at least one control routine therein to process the data received through the network controller 35. For example, the control routine stored in the data storage part 44 may comprise an operating system to drive the data processor 40 and an application program to execute various operations on the data received through the network controller 35.

The application program may comprise a codec program to decompress graphics data received from the network controller 35 and compressed into a predetermined format and an execution program to execute the graphics data decompressed through the codec program.

The main processor 41 loads the control routine stored in the data storage part 44 to the RAM 42 to execute the control routine to process the data received through the network controller 35 into a video signal. The main processor 41 may be provided as a chip comprising a central processing unit (CPU), a memory controller to control the RAM 42, and a graphics controller to process the data into the video signal.

The video signal output through the main processor 41 is converted into the second video signal through a video signal transmitter, such as a transition minimized differential signaling (TMDS) transmitter 45, to be output to the video signal processor 32. The second video signal can be a TMDS type video signal.

The bridge circuit 43 allows the data storage part 44 and the main processor 41 to communicate with each other. The main processor 41 and the bridge circuit 43 may be connected with each other through a predetermined bus, e.g., a peripheral component interconnect (PCI) bus 46.

The data processor 40 according to an embodiment of the present general inventive concept may be driven by an operating system and an application program stored in the computer 10 (i.e., the external device connected through the network 20), instead of being driven by the operating system and the application program stored in the data storage part 44.

For example, the main processor 41 of the data processor 40 may execute the operating system and the application program of the computer 10 and may receive desired data, such as the graphics data solely through the network 20. The data processor 40 may control the operating system or the application program of the computer 10 by receiving a command through a user interface, such as a keyboard or a mouse, connected through a USB and transmitting the received command to the computer 10 through the network 20.

The controller 34 controls the video signal processor 32 and the display part 33 to display the image on the display part 33. The controller 34 controls power supplied to the data processor 40 according to whether data is being transmitted and/or received by the network controller 35 through the network 20.

That is, the controller 34 controls the power supplied to the data processor 40 to be cut off if the data is not being transmitted and/or received by the network controller 35 through the network 20. However, if the data is being transmitted and/or received by the network controller 35 through the network 20, the controller controls the power to be supplied to the data processor 40. Thus, the power consumed by the data processor 40 is controlled according to whether the data is being transmitted and/or received by the network controller 35, thereby reducing power consumption due to the display part 30.

Accordingly, the controller 34 may receive data receiving information regarding whether data is being transmitted and/or received through the network 20 from the network controller 35. That is, if data is not transmitted and/or received through the network 20 for a predetermined period of time, the network controller 35 supplies the data receiving information corresponding to no data reception to the controller 34. Also, the network controller 35 supplies the data receiving information corresponding to data reception to the controller 34 if it is determined that data is received through the network 20 in a state that the controller 34 has cut off power supplied to the data processor 40 according to no data reception. Thus, the controller 34 may receive the data receiving information regarding whether data is transmitted and/or received through the network 20 from the network controller 35 and control the power supplied to the data processor 40 based on the received data receiving information.

Figure 4:
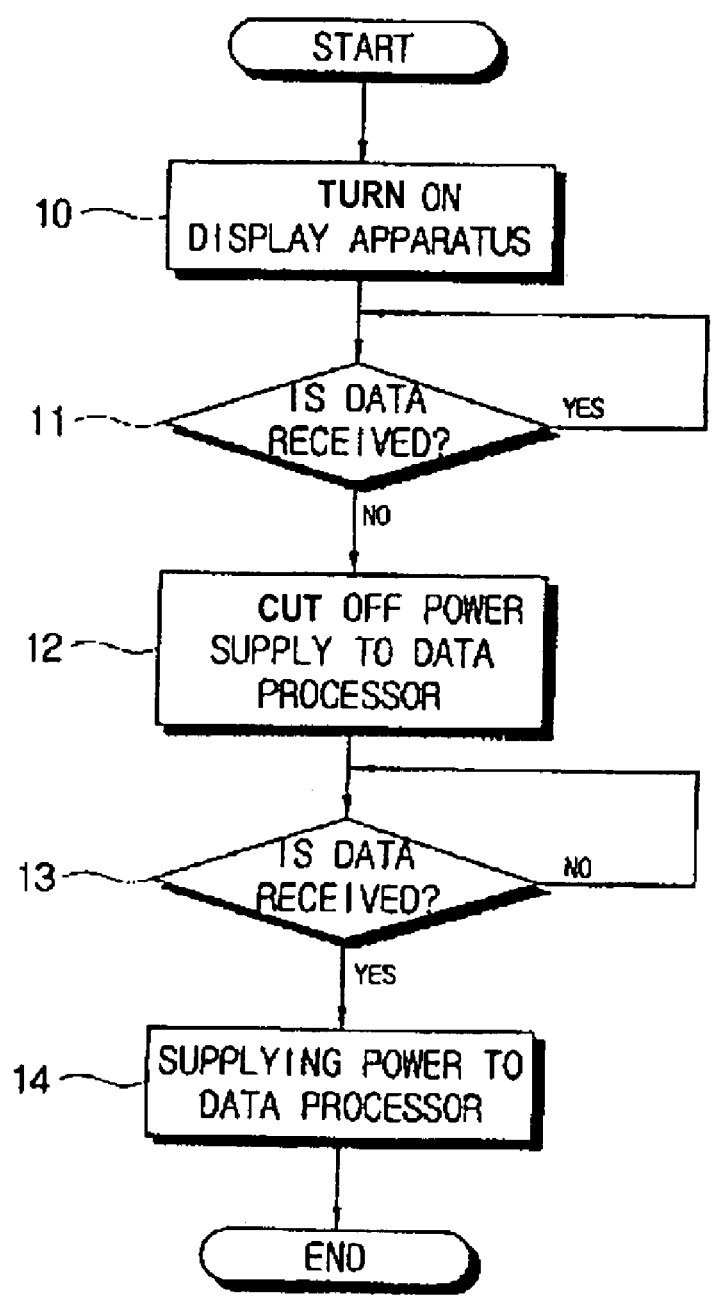
FIG. 4 is a control flowchart illustrating a method of controlling the display apparatus of FIG. 1 according to an embodiment of the present general inventive concept.

FIG. 4 illustrates a control method of the display apparatus 30 according to an embodiment of the present general inventive concept.

Referring to FIGS. 1-4, when the display apparatus 30 is turned on at operation 10, the network controller 35 determines whether data is being received through the network 20 at operation 11. If data is not being received through the network 20 for the predetermined period of time, the network controller 35 supplies the data receiving information corresponding to no data reception to the controller 34.

If the data receiving information corresponding to no data reception is supplied from the network controller 35, the controller 34 cuts off the power supplied to the data processor 40 at operation 12.

Then, the network controller 35 determines again whether data is received through the network controller 20 at operation 13. If it is determined that data is received through the network 20, the network controller 35 supplies the data receiving information corresponding to data reception to the controller 34.

If the data receiving information corresponding to data reception is supplied from the network controller 35, the controller 34 controls the power to be supplied to the data processor 40 at operation 14. Thus, the data processor 40 may process the data received by the network controller 35.

It is possible for the present general inventive concept to be realized on a computer-readable recording medium as a computer-readable code. Computer-readable recording mediums include many types of recording devices that store computer system-readable data. ROMs, RAMs, CD-ROMs, magnetic tapes, floppy discs, optical data storage, etc. are used as computer-readable recording mediums. Computer-readable recording mediums can also be realized in the form of carrier waves (e.g., transmission via Internet).

The present general inventive concept may be embodied as a computer readable recording medium having executable codes to perform a method of controlling a display apparatus having a network controller to receive image data through a network and data processor to processor the image data received through the network, the method comprising sensing whether the network controller is in a receiving state or an idle state, and controlling an amount of power supplied to the data processor based on the sensed state of the network controller.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display apparatus comprising:
a display part to display an image thereon;

a video signal processor to convert a first input video signal into a signal having a format displayable by the display part and a second input video signal different from the first input video signal into a signal having a format displayable by the display part;

a network controller connectable to a network to transmit and/or receive data according to a predetermined protocol;

a data processor to process the data transmitted and/or received through the network controller into the second video signal having a format processible by the video signal processor; and a controller in communication with the video signal processor, the network controller, and the data processor to control display of the first and second video signals and to control power to be supplied to the data processor according to a determination of whether data is transmitted and/or received by the network controller through the network, wherein the network controller supplies data receiving information regarding whether the data is transmitted and/or received through the network to the controller, and the controller maintains power to the video signal processor and the network controller while shutting off power to the data processor when the data receiving information indicates that no data is transmitted and/or received through the network controller.

2. The display apparatus according to claim 1, wherein the data processor comprises:

a data storage part to store at least one control routine therein to process data received through the network controller;

a memory to load the control routine;

a main processor to load the control routine to the memory and to execute the control routine; and a bridge circuit to allow the data storage part and the main processor to communicate with each other.

3. The display apparatus according to claim 2, wherein the main processor converts the data received through the network controller into a video signal and outputs the video signal, and the data processor further comprises a video signal transmitter to convert the video signal output by the main processor into a the video signal having the format processible by the video signal processor and to supply the converted video signal to the video signal processor.

4. The display apparatus according to claim 1, wherein the controller cuts off the power supplied to the data processor when data is not received by the network controller through the network for a predetermined period of time.

5. The display apparatus according to claim 4, wherein the controller controls the power to be supplied to the data processor when the data is received by the network controller through the network when the power supplied to the data processor is in a state of being cut off from the data processor.

6. The display apparatus according to claim 1, further comprising:

an input unit to input the video signal, wherein the video signal processor converts the input video signal through the input unit into a signal having format displayable by the display part and the controller controls the video signal processor and the display part to be operated in power saving mode according to the determination of whether the video signal is input to the video processor.

7. A display apparatus, comprising:

a network controller connectable to a network to receive network image data through the network;

a data processor to process the network image data and to generate a network video signal based on the network image data;

a video signal processor that processes a first image data received from a first source and the network video signal received from the data processor to be displayed;

a sensing unit to sense whether the network controller is in a receiving state or an idle state; and a controller in electrical communication with the data processor, the video signal processor, and the sensing unit to control an amount of power supplied to the data processor based on the sensed state of the network controller and to maintain power to the video signal processor and the network controller such that the display apparatus displays the first image data being different from the network image data while the controller cuts off power to the data processor when the network controller is in the idle state.

8. The display apparatus according to claim 7, wherein the sensing unit senses that the network controller is in the idle state when the network controller does not receive the image data through the network for a predetermined period of time, and senses that the network controller is in the receiving state whenever the network controller is not in the idle state.

9. The display apparatus according to claim 7, wherein the sensing unit senses that the network controller is in the receiving state when the network controller is receiving the image data through the network, and senses that the network controller is in the idle state when the network controller is not receiving the image data through the network.

10. The display apparatus according to claim 7, wherein the sensing unit controls power to be supplied to the data processor only when the network controller is sensed to be in the receiving state.

11. The display apparatus according to claim 7, wherein the sensing unit decreases the amount of power supplied to the data processor when the network controller is sensed to be in the idle state.

12. The display apparatus according to claim 7, further comprising:

an input unit to input an image signal;

a display unit to display at least one of the image signal and the image data; and a video signal processor to convert the input image signal and the processed image data into a format displayable by the display unit.

13. A display apparatus connectable to a network to receive first image data through the network and to display the received first image data thereon, comprising:

a network controller to receive the first image data;

a processing unit connected to the network controller to process the first image data received through the network to make the image data displayable and to generate a network video signal to be displayed via the display apparatus; and a controller to determine whether the first image data is being received through the network and to cut off power supplied to the processing unit when the first image data is not received through the network for a predetermined amount of time while controlling the display apparatus to display second image data corresponding to an input video signal different from the network video signal, the controller maintaining power to the network controller and a video signal processor when the power to the processing unit is cut off, wherein the video signal processor converts the network video signal into a format displayable by the display apparatus and converts the video input signal into a format displayable by the display apparatus.

14. The display apparatus according to claim 13, wherein the controller controls the power to be supplied to the processing unit when the image data is received through the network after not being received for the predetermined amount of time.

15. The display apparatus according to claim 13, further comprising:
a video input unit to input a video signal; and
a display unit to display the video signal and the image data.

16. The display apparatus according to claim 15, wherein the processing unit comprises:
a data processing unit to process the image data received through the network into an image signal; and
a signal processing unit to convert the video signal and the image signal into a format displayable by the display.

17. A method of controlling a display apparatus having a display part to display an image thereon, a video signal processor to convert each of a first input video signal and a second input video signal into a format displayable by the display part, a network controller connectable to a network and to transmit and receive data according to a predetermined protocol, and a data processor to process the data transmitted and/or received through the network controller and to generate the second input video signal, the method comprising:
determining whether data is being received by the network controller through the network;
cutting off power supplied to the data processor while maintaining power to the video signal processor and the network controller when it is determined that the data is not being received by the network controller;
displaying an image corresponding to the first input video signal during the cutting off power supplied to the data processor;
supplying power to the data processor when it is determined that data is being received by the network controller; and
displaying an image corresponding to the second input video signal during the supplying power to the data processor.

18. The method according to claim 17, further comprising:
determining whether the video signal is input to the video signal processor; and
controlling the video signal processing and the display part to be operated in power saving mode if it is determined that the video signal is not input to the video signal processor.

19. A method of controlling a display apparatus having a network controller connectable to a network to receive first image data through a network and data processor to process the first image data received through the network to generate a network video signal, and a video signal processor to process the network video signal from the data processor and an input signal, different from the network video signal received by the video signal processor, to be displayed, the method comprising:
sensing whether the network controller is in a receiving state or an idle state; and
maintaining power to the network controller and the video signal processor while cutting of power supplied to the data processor when the network controller exists in the idle state.

20. A non-transitory computer readable recording medium having executable codes to perform a method of controlling a display apparatus having a display part to display an image thereon, a video signal processor to convert each of a first input video signal and a second input video signal into a format displayable by the display part, a network controller to be connected to a network and to transmit and receive data according to a predetermined protocol, and a data processor to process data transmitted and/or received through the network controller and to generate the second input video signal, the method comprising:
determining whether data is being transmitted to the network controller through the network;
cutting off power supplied to the data processor while maintaining power to the video signal processor and the network controller when it is determined that the data is not being transmitted to the network controller;
displaying an image corresponding to the first input video signal during the cutting off power supplied to the data processor;
supplying power to the data processor when it is determined that data is being transmitted to the network controller
displaying an image corresponding to the second input video signal during the supplying power to the data processor.

21. A display apparatus comprising:
a network device connectable to a network to receive first data through the network according to a predetermined communication protocol;
a data processor that processes the first data output from the network device; and
a video signal processor that process second data received from a second input source and the first data output from the data processor to be displayed; and
a controller that detects whether the network device receives the first data through the network;
wherein the controller shuts off power supplied to the data processor while maintaining power to the network device and the video signal processor when the network device does not receive the first data through the network.

* * * * *